United States Patent [19]
Kauffman et al.

[11] Patent Number: 5,908,498
[45] Date of Patent: *Jun. 1, 1999

[54] PROCESS FOR PREPARING AN IMPROVED LOW-DUSTING, FREE-FLOWING PIGMENT

[75] Inventors: James W. Kauffman, Edmond; Phillip M. Story, Yukon; John E. Halko, Okarche, all of Okla.

[73] Assignee: Kerr-McGee Chemical LLC, Oklahoma City, Okla.

[ * ] Notice: This patent is subject to a terminal disclaimer.

[21] Appl. No.: 09/052,431

[22] Filed: Mar. 31, 1998

Related U.S. Application Data

[63] Continuation-in-part of application No. 08/801,656, Feb. 18, 1997, Pat. No. 5,733,365, which is a continuation-in-part of application No. 08/602,429, Feb. 16, 1996, abandoned.

[51] Int. Cl.[6] .................................................. C09C 1/36
[52] U.S. Cl. .......................... 106/437; 106/417; 106/418; 106/423; 106/429; 106/436; 106/438; 106/442; 106/445; 106/446; 106/447; 106/448; 106/449; 106/460; 106/465; 106/471; 106/475; 106/490; 106/491; 428/403; 428/404; 523/200
[58] Field of Search ................................... 106/436, 437, 106/438, 442, 445, 446, 447, 449, 417, 418, 423, 429, 448, 460, 465, 471, 475, 490, 491; 428/403, 404; 523/200

[56] References Cited

U.S. PATENT DOCUMENTS

| | | | |
|---|---|---|---|
| 3,547,671 | 12/1970 | Hitzemann et al. | 106/443 |
| 4,015,031 | 3/1977 | Reinhardt et al. | 427/213 |
| 4,056,402 | 11/1977 | Guzi, Jr. | 106/505 |
| 4,073,972 | 2/1978 | Nestler et al. | 427/136 |
| 4,127,422 | 11/1978 | Guzi, Jr. et al. | 106/460 |
| 4,151,154 | 4/1979 | Berger | 523/203 |
| 4,375,989 | 3/1983 | Mäkinen | 106/438 |
| 4,447,270 | 5/1984 | Howard et al. | 106/438 |
| 4,828,954 | 5/1989 | Hashimoto et al. | 430/110 |
| 4,978,396 | 12/1990 | Story | 106/436 |
| 5,114,486 | 5/1992 | Demosthenous et al. | 106/443 |
| 5,270,076 | 12/1993 | Evers | 427/220 |
| 5,306,755 | 4/1994 | Yau et al. | 524/296 |
| 5,356,470 | 10/1994 | Ott et al. | 106/437 |
| 5,411,761 | 5/1995 | Inokuchi et al. | 427/220 |
| 5,423,912 | 6/1995 | Sullivan et al. | 106/442 |
| 5,472,491 | 12/1995 | Duschek et al. | 106/415 |
| 5,733,365 | 3/1998 | Halko et al. | 106/437 |

FOREIGN PATENT DOCUMENTS

| | | |
|---|---|---|
| 2012017 | 10/1970 | Germany . |
| 58-099121-A | 6/1983 | Japan . |
| 5-221640 | 8/1993 | Japan . |
| 1406136 | 6/1988 | U.S.S.R. . |
| 1417574 | 12/1975 | United Kingdom . |
| 1442756 | 7/1976 | United Kingdom . |

OTHER PUBLICATIONS

Dr. U. Gesenhues, "Degree of Coverage and Photoactivity of Inorganic Treated TiO$_2$ Pigment," (Sep. 8–10, 1987) (English translation).
Perry's Chemical Engineers' Handbook, 6th Ed. (1984) pp. 8–13, 14, 15, 34, 35, 36, 49 and 58, (no month).
*CPI Purchasing*, Jul., 1991, p. 49.
*Technological Review*, "From Treating Solution To Filler Surface And Beyond—The Life history of a Silane Coupling Agent" by Meyer R. Rosen, vol. 50, No. 644, Sep. 1978, pp. 70–82.

*Primary Examiner*—Mark L. Bell
*Assistant Examiner*—Scott L. Hertzog
*Attorney, Agent, or Firm*—Herbert M. Hanegan; J. Rodgers Lunsford, III; Charles L. Warner, II

[57] ABSTRACT

A process for preparing a low-dusting, free-flowing pigment which has not been subjected to any micronizing treatment comprising the steps of providing an inorganic pigment material; providing a source of water; forming a fine, well dispersed slurry of the pigment and water; milling the slurry; depositing a treating agent having the formula ROOCCHSO$_3$MCH$_2$COOR' wherein R and R' are monovalent alkyl radicals having from about 2 to about 20 carbon atoms, and M is a metallic monovalent cation on the slurried milled pigment; and drying the pigment material having a treating agent deposited thereon. The invention also provides the free-flowing pigments produced by this process.

39 Claims, No Drawings

PROCESS FOR PREPARING AN IMPROVED LOW-DUSTING, FREE-FLOWING PIGMENT

CROSS REFERENCES TO RELATED APPLICATIONS

This application is a continuation-in-part of application Ser. No. 08/801,656 filed Feb. 18, 1997, now U.S. Pat. No. 5,733,365, which is a continuation-in-part of application Ser. No. 08/602,429 filed Feb. 16, 1996, now abandoned.

BACKGROUND OF THE INVENTION

1. Field of the Invention

The present invention relates to a process for preparing low-dusting, free-flowing dispersible pigments for use in paint and plastic compositions, and the pigments produced thereby. More specifically, the present invention relates to the aqueous milling, surface treatment, and spray-drying of inorganic pigments to achieve low-dusting and good dispersibility without the expensive step of micronization. Most specifically, the present invention relates to treating sandmilled titanium dioxide pigments with a surfactant before spray-drying the pigment, to eliminate the need for micronization or jet-milling while maintaining good processibility and dispersibility in polyolefin resins.

2. Description of the Prior Art

Titanium dioxide pigments and other inorganic pigments normally produced and used in the paint, plastics, or paper industry, are generally in the form of a finely divided powder. The powders are usually jet-milled, or micronized, as a final step in their production. Jet-milling contributes dispersibility and gloss, but is also an energy-intensive and expensive step. Jet-milled powders are inherently dusty and exhibit poor flow characteristics. Although free-flowing powders with low dust can be obtained by spray-drying, these powders generally exhibit poor pigmentary properties. Thus, pigment end users have generally had to choose between free-flowing, low-dusting, spray-dried pigments with poor pigmentary properties and dusty, jet-milled pigments with poor flow characteristics.

The surface treatment of pigments to achieve improved performance characteristics in plastic compositions, is known in the art. For example, U.S. Pat. No. 4,986,853 discloses the coating of lamina-shaped pearlescent pigments with monocarboxylic acids or cyclohexanone condensate resins and a plasticizer, to improve flowability and reduce dust generation. Additionally, U.S. Pat. No. 4,762,523 discloses coating a moist pigment with a polyester surfactant, then adding mineral oil or wax to the pigment and applying intensive shear stress to achieve a free-flowing, permanently non-dusting pigment. In U.S. Pat. No. 4,563,221, titanium dioxide pigments are coated with a combination of isostearic acid, dodecyl benzene sulphonic acid, and a cationic emulsifying agent and then spray-dried, without micronization, to improve flowability and reduce dust production. Also, in U.S. Pat. No. 3,660,129, titanium dioxide pigments are coated with hydrous oxides, then sand-milled and spray-dried to improve flowability.

Further examples of the surface treatment or coating of pigments to improve processibility include the coating process disclosed in U.S. Pat. No. 4,514,231. This patent teaches the coating of an oxidic or silicate filler with an organosilicon emulsifying compound and then spray-drying to improve the reinforcing properties of the filler. Similarly, U.S. Pat. No. 4,909,853 teaches the aqueous coating of organic pigments and/or carbon black with a sulphosuccinic acid ester surfactant followed by spray drying to improve pigment dispersibility in thermoplastics. Also, U.S. Pat. No. 4,464,203 discloses the treatment of inorganic or organic pigments with an amine and ethylene oxide block copolymer surfactant to improve pigment dispersibility and other properties in a variety of applications. U.S. Pat. No. 4,156,616 discloses the treatment of inorganic and/or organic pigments with an alkylene oxide addition product of a long-chain amine and an anionic surfactant with an aromatic moiety, for improved dispersibility.

In U.S. Pat. No. 4,056,402, aqueous slurries of inorganic or organic pigments are milled in the presence of a nonionic, polyether alcohol dispersing agent and nonionic cellulose ether to reduce dusting and improve dispersibility. Also, in U.S. Pat. No. 3,947,287, aqueous, colored, inorganic and organic pigments are coated with the reaction product of a polyhydroxyl compound and a water retaining agent for improved stability and performance. U.S. Pat. No. 3,925,095 teaches the treatment of inorganic pigments or fillers with hydroxyalkylated alkylene diamine dispersing-agent for improved flowability and dispersibility in various applications.

Other examples of pigment surface treatment and coating processes include the treatment process described in U.S. Pat. No. 4,375,520. This patent teaches the production of dustless particles, including pigments, by treatment of the particles with a composition containing a solid low-molecular weight polymer and a liquid polymeric substance such as expoxidized soybean oil at temperatures above the melt point of the polymer. Also, U.S. Pat. No. 4,127,421 discloses the aqueous treatment of a lead chromate-containing pigment with a friable hydrocarbon resin and a cationic surfactant to produce free-flowing, non-dusting granules.

In U.S. Pat. No. 4,599,114, an aqueous slurry of titanium dioxide is treated with a surfactant formed from the reaction of a diamine, a carboxylic acid, and a fatty acid to improve pigment dispersibility and processibility in various applications. U.S. Pat. No. 5,228,912 teaches the surface treatment of platelet-shaped pigments with a polyacrylate, polymethacrylate, or salt thereof, for improved dispersibility in paints and printing inks. Also, U.S. Pat. No. 5,199,986 discloses a process wherein previously spray-dried inorganic pigment granules are coated with water and solutions of salts of boron, aluminum, silicon, titanium, zinc, brass, or tin, to improve processibility and reduce dust production.

U.S. Pat. No. 5,266,622 teaches the production of aqueous dispersions of inorganic or organic pigments or fillers wherein the pigments or fillers are coated with a water soluble polymer, a nonionic alkylene oxide adduct, and other dispersants, to improve flow properties and increase the stability of the pigment dispersion. Similarly, U.S. Pat. No. 4,186,028 teaches the coating of various pigments and fillers with a phosphonocarboxylic acid and/or a phosphonocarboxylic acid salt to produce fluid, dispersible, aqueous filler or pigment dispersions.

None of the aforementioned patents suggest or teach the process comprising milling an aqueous pigment slurry, treating the slurry with a treating agent, and spray-drying the slurry, which is the subject of this application.

SUMMARY OF THE INVENTION

The present invention provides a process for preparing pigments characterized by improved flowability, low dust production, and good dispersibility, without the energy-intensive and expensive step of micronization. In this process at least one treating agent is deposited on a pigment, preferably an inorganic pigment, that has been milled, as an aqueous slurry. The treated slurry is then spray dried for end-use performance without jet-milling or micronization.

DESCRIPTION OF THE PREFERRED EMBODIMENTS

The pigments which can be subjected to the hereinafter described treating process to provide the improved pigments of the present invention include any of the white or colored, opacifying or non-opacifying particulate pigments (or mineral pigments) known and employed in the surface coatings (e.g., paint) and plastics industries. For purposes of this present description, the term pigments is employed broadly to define materials which are particulate by nature and nonvolatile in use and typically are most usually referred to as inerts, fillers, extenders, reinforcing pigments and the like and are preferably inorganic pigments.

Representative but non-limiting examples of pigments which can be treated as herein described to provide the improved pigments of this invention include white opacifying pigments such as titanium dioxide, basic carbonate white lead, basic sulfate white lead, basic silicate white lead, zinc sulfide, zinc oxide, composite pigments of zinc sulfide and barium sulfate, antimony oxide and the like, white extender pigments such as calcium carbonate, calcium sulfate, china and kaolin clays, mica, diatomaceous earth and colored pigments such as iron oxide, lead oxide, cadmium sulfide, cadmium selenide, lead chromate, zinc chromate, nickel titanate, chromium oxide and the like. Of all the pigments useful in producing the improved pigments of the present invention, the most preferred pigment is titanium dioxide.

In general, the preferred titanium dioxide pigment for use in the process of this invention can be either the anatase or rustle crystalline structure or a combination thereof. The pigment may be produced by various known commercial processes which are familiar to those of skill in this art but which processes do not form any part of the present invention. Thus, the particular pigment can be produced by either the well known sulfate process or the well known vapor phase oxidation process. The sulfate process typically involves the steps of leaching a titaniferous ore with sulfuric acid to produce a titanium sulfate solution, hydrolysis of the titanium sulfate to form a titanium dioxide precipitate and calcination of this precipitate in the presence of suitable additives to develop the desired crystalline structure in the final calcined titanium dioxide product. In the vapor phase oxidation process, a titanium halide such as titanium tetrachloride is oxidized in the vapor phase at elevated temperatures to produce what is commonly referred to as raw titanium dioxide. This raw pyrogenic titanium dioxide product is then recovered, subjected to milling and classification operations and, following treatment to deposit various hydrous metal oxide coatings upon the pigment, subjected to a final milling step to provide a pigment of the desired particle size.

Typically, the final milling step comprises the use of fluid energy milling techniques. These techniques involve conveying the pigment through a milling apparatus such as the fluid energy mills disclosed in U.S. Pat. Nos. 2,032,827 and 2,219,011 using one or more gaseous streams produced by jets of a milling fluid such as air or steam to effect collision between individual pigment particles and thus a reduction in size of such particles. Various additive materials may be incorporated into the pigment during the fluid energy milling either to improve the milling of the pigment as disclosed in U.S. Pat. No. 3,531,310 or to enhance particular chemical, physical, and optical properties of the resultant milled pigment as disclosed in U.S. Pat. No. 4,752,340. Representative examples of such additive materials include polyols such as glycerol, pentaerythritol trimethylolethane, trimethylolpropane and the like, fatty acids such as oleic acid, stearic acid and the like, trialkanolamines such as triethanolamine and the like and amine salts such as triethanolamine melonate triisopropanolamine succinate and the like.

In the manufacture of certain pigments, particularly titanium dioxide, it is difficult to produce a product that is low-dusting, free-flowing, dense and easily dispersed in paints and plastic melts. As discussed above, titanium dioxide pigments normally produced and used in the paint, plastics and paper industries are generally in the form of a finely divided powder. These powders are usually jet milled or micronized as a final step in their production. Such milling contributes to dispersibility and gloss, but is an energy-intensive and therefore costly step. Such powders are inherently dusty and exhibit poor flow characteristics. Free-flowing powders with low dusting can be obtained by prior art methods of spray drying, however these powders exhibit poor pigmentary properties.

It has been discovered that pigments produced by the present inventive process exhibit good optical and dispersion properties as well as low-dusting and free-flowing properties without the incorporation of the energy-intensive, costly step of micronization. The product resulting from the inventive process is low-dusting, free-flowing, dense, both oleophilic or hydrophobic, and hydrophilic and is easily dispersed in paint and plastic formulations.

The present process is particularly well suited to titanium dioxide pigments but can be equally beneficial to other pigmentary inorganic oxides used in paints and plastics. The surface treatment agents used may include a wide range of substances generally containing either hydrophilic or hydrophobic ends or both or admixtures of hydrophilic and hydrophobic agents. The hydrophilic ends may contain, but are not limited to, carboxyl, phosphate, sulfate, alcohol, or amnine groups. The hydrophobic groups may contain, but are not limited to, aliphatic groups, silane and siloxane groups.

The function of the surface treatment agents is to prevent the dispersed particles from cementing together during drying. The agents also may promote flocculation in the liquid phase during processing to allow the product to be filtered and washed. The agents serve a third function in the process in acting as a binding agent in the dried product to both reduce dusting and allow the formation of prills, beads or spheres to promote free flowing properties.

Although spray drying is the preferred drying method, other drying equipment may be used to obtain the free-flowing product including, but not limited to, an agglomerator, fluid bed dryer, belt drier, spray drier with a rotary atomizer, spray drier with a nozzle atomizer, or a spray tower with a nozzle atomizer or a combination of the above drying techniques or other drying techniques that can be used to dry titanium dioxide.

The process of the present invention yields a low-dusting, free-flowing pigment which has not been subjected to any micronizing treatment comprising the steps of: providing a pigment material, providing a source of water, forming a fine, well dispersed slurry of the pigment and water, milling the slurry, depositing a treating agent on the slurried milled pigment, and drying the pigment material having a treating agent deposited thereon. Advantageously, the pigment material is an inorganic pigment material and preferably is titanium dioxide. Advantageously, the treating agent is deposited on the pigment material in an amount of from about 0.1 percent to about 3.0 percent by weight based on the weight of the pigment material. Preferably the treating agent is deposited in an amount of from about 0.5 percent to about 1.0 percent and most preferably in an amount of about 0.8 percent. Advantageously, the slurry contains from about 10 percent to about 70 percent by weight pigment material. Preferably the slurry contains from about 30 percent to about 60 percent by weight pigment material and most preferably the slurry contains about 50 percent weight pigment material.

Although the milling step may be carried out by any one of the known milling equipment used with pigments, the preferred equipment is a sand mill.

The process of the present invention advantageously includes the step of adjusting the slurry pH in order to obtain a final product pH of from about 5 to about 9, preferably from about 6 to about 8. Advantageously the slurry is filtered to obtain a filtercake of from about 30% to about 80% solids, preferably from about 50% to about 75% solids, and most preferably from about 60% to about 75% solids.

Advantageously the filtercake is washed with a solvent for salt, preferably water, to remove salts, decreasing the salt content. Multiple filtration, washing, and repulping stages may also be used to obtain a targeted salt content. The salt content advantageously is low enough to give a dried product specific resistivity (measured by dispersing 20 g of pigment in 180 g of high purity, low salt content, high specific resistance water) of from about 5,000 to about 50,000 ohm-cm, preferably from about 8,000 to about 25,000 ohm-cm, and most preferably from about 10,000 to about 20,000 ohm-cm, before addition of an organic treating agent. Alternately, the washing step can be done after the addition of an organic treating agent.

The process of the present invention may include the step of coating the pigment while in the slurry with a metal oxide. Advantageously, the metal oxide is selected from the group consisting of $Al_2O_3$, $SiO_2$, and $ZrO_2$. Preferably the process of coating the pigment with a metal oxide yields a coating of from about 0.10 percent to about 1.5 percent metal oxide.

The treating agent advantageously is selected from the group consisting of anionic, cationic, and nonionic surfactants. Where the treating agent is an anionic surfactant, advantageously the pH during the depositing step is from about 1.5 to about 8.5, preferably the pH is from about 2.5 to about 5.5, and most preferably the pH of the depositing step is about 3.5. When the treating agent is a cationic surfactant, the pH of the depositing step advantageously is from about 4.5 to about 11.5. In the case where the treating agent is a nonionic surfactant the pH of the depositing step is advantageously from about 1.5 to about 11.5.

Advantageously, the slurry step is carried out at a temperature of from about 10° C. to about 90° C., preferably from about 25° C. to about 80° C, and most preferably at a temperature of about 60° C.

Advantageously, the step of depositing the treating agent on the slurried milled pigment is performed in a time of from about 5 minutes to about 60 minutes, preferably in a time of from about 5 minutes to about 30 minutes, and most preferably, the depositing step is performed in a time of about 5 minutes.

The treating agents useful in the present process to provide pigments of improved properties include those compounds having the formula, $ROOCCHSO_3MCH_2COOR'$ wherein R and R' are monovalent alkyl radicals containing from about 2 to about 20 carbon atoms, preferably from about 4 to about 14 carbon atoms and most preferably about 8 carbon atoms and wherein M is a metallic monovalent cation, most preferably, sodium. The monovalent alkyl radicals, R and R', in this formula, can be either straight-chain or branched-chain alkyl radicals.

R may, but need not, equal R'. Representative examples of such radicals include methyl, ethyl, n-propyl, isobutyl, n-pentyl, isopentyl, n-hexyl, octyl, tridecyl radicals and the like. Non-limiting examples are dialkyl sulfosuccinate treating agents useful in preparing the improved pigments of the present invention including dioctyl sodium sulfosuccinate, diisobutyl sodium sulfosuccinate, bis-tridecyl sodium sulfosuccinate, dihexyl sodium sulfosuccinate and the like.

The amount of treating agent employed to treat the pigments described hereinabove, and particularly titanium dioxide pigment, will be an amount sufficient to provide a treated pigment which while not being subjected to any micronizing treatment still exhibits low-dusting and free-flowing properties equal to or greater than that of pigment which has been subjected to a costly micronizing treatment. Broadly, the amount of treating agent employed will be in the range of from about 0.3 to about 3.0 weight percent based upon the weight of the pigment, preferably an amount ranging from about 0.5 to about 1.0 weight percent, and most preferably about 0.8 weight percent.

The resulting treated inorganic pigments can be employed to readily and uniformly in a wide variety of paint and plastic formulations. These include such well known classes of plastics as polyolefin resins, acrylic resins, polyester resins, polyamide resins, epoxy resins, phenolic resins, poly(vinylaromatic) resins, poly(vinylhalide) resins, polycarbonate resins, polyurethane resins, and the like. Representative, but non-limiting, examples of these various classes of thermoplastic resins include: polyolefin resins such as polyethylene, polypropylene, and the like; acrylic resins such as poly(acrylic acid), poly(methacrylic acid), poly(methylacrylate), poly(methylmethacrylate), and the like; polyester resins such as poly(ethylene terephthalate), poly(butylene terephthalate) and the like; polyamide resins such as nylon-6 and nylon-6,6, and the like; epoxy resins such as poly(epichlorohydrin/bisphenol A) and the like and esters thereof such as those prepared by the esterification of poly(epichlorohydrinibisphenol A) with a fatty acid, resin acid, tall oil acid or mixtures thereof; phenolic resins such as those derived from the reaction of formaldehyde with phenol, resorcinol, cresol, p-phenylphenol, and the like; poly(vinylaromatic) resins such as polystyrene and copolymers thereof such as poly(styrene-acrylonitrile), poly(styrene-butadiene-acrylonitrile), and the like; poly(vinylhalide) resins, such as poly(vinylchloride), poly(vinylchloride/vinylidene chloride) and the like; polycarbonate resins such as those attained either by the phosgenation of dihydroxy aliphatic or aromatic monomers such as ethylene glycol, propylene glycol, bisphenol A (i.e., 4,4'-isopropylidene diphenol), and the like or by the base catalyzed transesterification of bisphenol A with diphenyl carbonate to produce bisphenol A polycarbonate; and polyurethane resins obtained by the reaction of di- or polyfunctional hydroxy compounds such as glycols or hydroxyl terminated polyesters and polyethers with di- or polyfunctional diisocyanates.

The amounts of the treated pigments of this invention which can be added directly to the above described plastics can vary widely depending upon the intended end use for these resins. Thus, thin films sometimes will require very high pigment levels while thick paints may only require a very small percentage. Accordingly, the amount of the treated pigment employed can range from as little as about 1 weight percent to as much as about 80 weight percent based upon the weight of the thermoplastic resin.

In yet a further embodiment of the present invention, the treated inorganic pigments of the present invention have exhibited particular utility in the preparation of thermoplastic concentrates. Broadly, these thermoplastic concentrates will comprise a continuous phase constituting a thermoplastic resin and a disperse phase constituting the treated inorganic pigments of this invention. The continuous phase may comprise any of the thermoplastic resins hereinbefore described, including the polyolefin resins, acrylic resins, polyester resins, polyamide resins, epoxy resins, phenolic resins, poly(vinylaromatic) resins, poly(vinylhalide) resins, polycarbonate resins, polyurethane resins, and the like.

In preparing the thermoplastic concentrates useful with the present invention, the amount of pigment incorporated into the thermoplastic resin continuous phase can vary widely. In general, this amount will vary depending upon the level of pigmentation desired or required in the final or finished end product employing these thermoplastic concentrates as pigmenting vehicles, and the effectiveness of the processing equipment utilized to reduce, dilute or dissolve the thermoplastic concentrates in the thermoplastic resins used to produce the final or finished end products. Broadly, the thermoplastic concentrates may contain weight ratios of the treated pigment to the thermoplastic resin in which it is dispersed ranging from about 0.5:1 to about 5:1. Within such range, the treated pigment of the present invention can be easily and uniformly dispersed or distributed throughout the thermoplastic resin employed as the continuous phase of the thermoplastic concentrate produced.

The invention is further described and illustrated by the following examples. These examples represent specific embodiments of the invention and are not to be construed as limitations thereon.

EXAMPLE 1

A slurry of $TiO_2$ sandmill discharge with the classification of 81 percent passing through a $0.49\mu$ screen and about 42 percent solids was spray dried in a nozzle atomizer directed upwards. The drying gas was fed countercurrent to the spray direction. The inlet gas temperature was 400° C. and the outlet gas temperature was 165° C. The slurry pH was about 10 and was at room temperature. A SF1.3 type nozzle with a 365 psig feed pressure was used to spray the slurry in the dryer. The drying air rate was 3,150 lb/hr.

The moisture content of the spray dried product was 0.19 percent. The spray dried product had a particle size distribution of 10 percent, 50 percent, and 90 percent passing through screens of $45\mu$, $100\mu$, and $154\mu$, respectively. The TOC, $Na_2SO_4$, NaCl, free Cl—, and $Al_2O_3$ contents were 0.03, 0.05, 0.25, 0.15, and 0.76 percent, respectively. The pH and specific resistance were 9.7 and 1,375 ohm/cm. The poured and tapped densities were 1.01 and 1.06 g/cc. The sprayed dried powder was free flowing and low dusting.

The spray dried powder was then mixed into low density polyethylene at a 75 percent weight loading to equilibrium torque values in a Brabender torque rheometer. The equilibrium torque was 3,320 meter-grams. The plastic stock temperature at test end was 176° C. The total energy for equilibrium torque was 15,493 kilometer-grams.

This prior art process dried product produced a very high equilibrium torque without micronization. Micronization of the product with an organic milling aid such as TME or TMP, at about a 1.5 steam:pigment ratio, reduced the 75 percent loading in LDPE equilibrium torque lo to about 1,400–1,500 meter-grams. Typically, a lower equilibrium torque value indicates better plastic processing performance.

Therefore, the prior art requires additional processing rendering the process cost greater because micronization is necessary to achieve an acceptable equilibrium torque value.

EXAMPLE 2

232 pounds of $TiO_2$ sandmill discharge slurry was treated with sodium dioctyl sulfosuccinate in a 60 gallon stirred reaction tank. The sandmill discharge $TiO_2$ had a classification of greater than 95 percent passing through a $0.5\mu$ screen. The slurry density was 36.8 percent solids and the initial pH was 9.3. The slurry was heated to 60° C. using steam and was agitated sufficiently to produce a slight vortex.

350 mL of concentrated HCl acid was added over several minutes to lower the slurry pH to 3.4. 1.87 pounds of sodium dioctyl sulfosuccinate was then added over several minutes. The slurry viscosity increased almost immediately due to flocculation of the $TiO_2$ and the agitation was increased at the same time to produce a slight vortex. The sodium dioctyl sulfosuccinate was reacted for five minutes and the slurry was then pumped to a 55 gallon drum and cooled. The $TiO_2$ settled from 36.8 percent solids to about 49 percent solids in 15 minutes.

The slurry was adjusted to 42.7 percent solids and was spray dried through a nozzle atomizer directed upwards. The dryer was fed countercurrent to the spray direction. The slurry pH and temperature were at 4.0 and at room temperature. The inlet drying gas temperature was 450° C. and the outlet gas temperature was 160° C. A SG1.4 type nozzle with a 500 psig feed pressure was used to spray the slurry into the dryer. The drying air rate 3,061 lb/hr.

The moisture content of the spray dried product was 0.28 percent. The spray dried product had a particle size distribution of 10 percent, 50 percent, and 90 percent passing through screens of $38\mu$, $98\mu$, and $180\mu$, respectively. The sodium dioctyl sulfosuccinate, TOC, $Na_2SO_4$, NaCl, free Cl—,. and $Al_2O_3$ contents were 0.81, 0.46, 0.06, 0.16, 0.16, and 0.98 percent, respectively. The pH and specific resistance were 5.3 and 1,936 ohm/cm. The poured and tapped densities were 0.91, and 1.00 g/cc. The spray dried powder was free-flowing and low-dusting.

The spray dried powder was then mixed into low density polyethylene at a 75 percent weight loading to give equilibrium torque values of about 1,340 meter-grams. The plastic stock temperature at test end was 123 ° C. The total energy for equilibrium torque was 4,679 kilometer-grams. The lower stock temperature, equilibrium torque, and total energy indicate the product processed well in polyethylene. In addition, micronization of the product is not necessary to reach an acceptable equilibrium torque. Therefore, the process cost is lower because micronization is not necessary, and the packaging and storage costs are lower because the high poured density of the spray dried product is retained.

EXAMPLE 3

241 pounds of $TiO_2$ sandmill discharge slurry was treated with sodium dioctyl sulfosuccinate in a 60 gallon stirred reaction tank. The sandmill discharge $TiO_2$ was classified with greater than 95 percent passing through a $0.5\mu$ screen. The slurry density was 36.8 percent solids and the initial pH was 9.3. The slurry was heated to 60° C. using steam and was agitated sufficiently to produce a slight vortex.

6.22 pounds of 1.46 g/cc sodium aluminate was added to the slurry over five minutes to increase the pH to 11.2. The sodium aluminate was allowed to react for 15 minutes before 1,975 mL of concentrated HCl acid was added over several minutes. After the pH decreased to 3.6, 2.94 pounds of sodium dioctyl sulfosuccinate was added over several minutes. The slurry viscosity increased almost immediately due to flocculation of the $TiO_2$ and agitation was increased at the same time to produce a slight vortex. The sodium dioctyl sulfosuccinate was reacted for five minutes and the slurry was then pumped to a 55 gallon drum and cooled.

The slurry was adjusted to 33.9 percent solids and was spray dried through a nozzle atomizer directed upwards. The drying gas was fed countercurrent to the spray direction. The slurry pH and temperature was 4.0 and room temperature. The inlet drying gas temperature was 430° C. and the outlet gas temperature was 163° C. A SG1.2 type nozzle with a 500 psig feed pressure was used to spray the slurry in the dryer. The drying air rate was 2,973 lb/hr.

The moisture content of the spray dried product was 0.36 percent. The spray dried product had a particle size distribution of 10 percent, 50 percent, and 90 percent passing through 45, 99, and 147$\mu$ screens, respectively. The sodium dioctyl sulfosuccinate, TOC, $Na_2SO_4$, NaCl, free Cl—, and $Al_2O_3$ contents were 1.18, 0.67, 0.03, 1.16, 0.89, and 1.51 percent respectively. The pH and specific resistance were 5.1 and 408 ohm/cm. The poured and tapped densities were 0.83 and 0.89 g/cc. The spray dried powder was free flowing and low dusting.

The spray dried powder was mixed into low density polyethylene at 75 percent weight loading to give equilibrium torque values of about 1,440 meter-grams. The plastic stock temperature at test end was 130° C. The total energy for equilibrium torque was 5,491 kilometer-grams. Micronization of the product was not necessary to reach a satisfactory equilibrium torque.

A 1,440 meter-grams equilibrium torque indicates the treated $TiO_2$ has excellent processability in plastics, together with the advantage of increased durability from the alumina coating.

Therefore, the process cost is lower because micronization is not necessary and packaging and storage costs are lower because the high poured density of the sprayed dried material is retained.

What is claimed is:

1. A process for preparing a low-dusting, free-flowing pigment which has not been subjected to any micronizing treatment comprising the steps of:
   a. providing an inorganic pigment material;
   b. providing a source of water;
   c. forming a fine, well dispersed slurry of the pigment and water;
   d. milling the slurry;
   e. forming the slurry into a product having a pH of from about 5 to about 9;
   f. depositing a treating agent having the formula ROOCCHSO$_3$MCH$_2$COOR' wherein R and R' are monovalent alkyl radicals having from about 2 to about 20 carbon atoms, and M is a metallic monovalent cation on the slurried milled pigment; and
   g. drying the pigment material having a treating agent deposited thereon.

2. The process of claim 1 wherein R and R' are monovalent alkyl radicals having from about 4 to about 14 carbon atoms each.

3. The process of claim 2 wherein R and R' are monovalent alkyl radicals having about 8 carbon atoms each and M is sodium.

4. The process of claim 1 wherein said treating agent is sodium dioctyl sulfosuccinate.

5. The process of claim 1 wherein said pigment material is titanium dioxide.

6. The process of claim 1 wherein said treating agent is deposited on said pigment material in step (f) in an amount in the range of from about 0.1 percent to about 3.0 percent by weight based on the weight of said pigment material.

7. The process of claim 6 wherein said treating agent is deposited on said pigment material in step (f) in an amount of from about 0.5 percent to about 1.0 percent by weight based on the weight of said pigment material.

8. The process of claim 7 wherein said treating agent is deposited on said pigment material in step (f) in the amount of about 0.80 percent by weight based on the weight of said pigment material.

9. The process of claim 1 wherein the slurry formed in step (c) contains from about 10 percent to about 70 percent by weight pigment material.

10. The process of claim 9 wherein the slurry formed in step (c) contains from about 30 percent to about 60 percent by weight pigment material.

11. The process of claim 10 wherein the slurry formed in step (c) contains about 50 percent by weight pigment material.

12. The process of claim 1 wherein milling step (d) is carried out in a sandmill.

13. The process of claim 1 further comprising the step of coating the pigment in the slurry formed in step (d) with a metal oxide.

14. The process of claim 13 wherein the metal oxide is selected from the group consisting of $Al_2O_3$, $SiO_2$, and $ZrO_2$.

15. The process of claim 13 wherein the metal oxide coating is present in an amount of from about 0.10 percent to about 1.5 percent by weight.

16. The process of claim 1 wherein the treating agent is an anionic surfactant.

17. The process of claim 16 wherein depositing step (f) is conducted at a pH from about 1.5 to about 8.5.

18. The process of claim 17 wherein depositing step (f) is conducted at a pH from about 2.5 to about 5.5.

19. The process of claim 1 wherein the treating agent is a cationic surfactant.

20. The process of claim 19 wherein depositing step (f) is conducted at a pH from about 4.5 to about 11.5.

21. The process of claim 1 wherein the treating agent is a nonionic surfactant.

22. The process of claim 21 wherein depositing step (f) is conducted at a pH from about 1.5 to about 11.5.

23. The process of claim 1 wherein step (c) is carried out at a temperature of from about 10° C. to about 90° C.

24. The process of claim 23 wherein step (c) is carried out at a temperature of from about 25° C. to about 80° C.

25. The process of claim 13 wherein depositing step (f) is carried out for a time of from about 5 minutes to about 60 minutes.

26. The process of claim 25 wherein depositing step (f) is carried out for a time of from about 5 minutes to about 30 minutes.

27. A low-dusting, free-flowing, non-micronized pigment produced by the process of claim 1.

28. A paint formulation containing the pigment of claim 27.

29. A plastic formulation containing the pigment of claim 27.

30. The process according to claim 1, wherein the pH of step (e) is about 6 to about 8.

31. The process of claim 1 further comprising filtering the slurry obtained in step (e) to obtain a filtercake of from about 30% to about 80% solids.

32. The process of claim 31 wherein the filtercake has from about 50% to about 75% solids.

33. The process of claim 32 wherein the filtercake has from about 60% to about 75% solids.

34. The process of claim 31 further comprising the step of washing the filtercake to lower salt content thereof.

35. The process of claim 34 wherein the filtercake is washed after step (f).

36. The process of claim 34 wherein the filtercake when dried has a specific resistivity of from about 5,000 to about 50,000 ohm-cm.

37. The process of claim 36 wherein the filtercake when dried has a specific resistivity of from about 8,000 to about 25,000 ohm-cm.

38. The process of claim 37 wherein the filtercake when dried has a specific resistivity of from about 10,000 to about 20,000 ohm-cm.

39. A process for preparing a low-dusting, free-flowing pigment product having a pigment content greater than 95% which has not been subject to any micronizing treatment, for use in plastics concentrates comprising the steps of:

(a) providing an inorganic pigment material;

(b) providing a source of water;

(c) forming a fine, well-dispersed slurry of the pigment and water;

(d) milling the slurry such that greater than 95% passes through a 0.5 micron screen;

(e) depositing a treating agent having the formula $ROOCCHSO_3MCH_2COOR'$ wherein R and R' are monovalent alkyl radicals having from about 2 to about 20 carbon atoms, and M is a metallic monovalent cation in an amount of from about 0.3 to about 3.0 percent by weight based on the weight of said pigment material on the slurried milled pigment; and (f) spray drying the pigment material having a treating agent deposited thereon; said dried pigment material having a particle size distribution of about 10 percent, about 50 percent, and about 90 percent passing through screens of $45\mu$, $100\mu$, and $154\mu$ respectively.

* * * * *